(12) United States Patent
Kornelsen et al.

(10) Patent No.: US 10,717,601 B2
(45) Date of Patent: Jul. 21, 2020

(54) MECHANICAL CONVEYOR BELTS FOR GRANULATED RAW MATERIALS

(71) Applicants: Eddy Kornelsen, Cuauhtemoc (MX); Jose Eliseo Meraz, Jr., Avondale, AZ (US)

(72) Inventors: Eddy Kornelsen, Cuauhtemoc (MX); Jose Eliseo Meraz, Jr., Avondale, AZ (US)

( * ) Notice: Subject to any disclaimer, the term of this patent is extended or adjusted under 35 U.S.C. 154(b) by 0 days.

(21) Appl. No.: 16/038,697

(22) Filed: Jul. 18, 2018

(65) Prior Publication Data
US 2019/0210807 A1 Jul. 11, 2019

(51) Int. Cl.
| | | |
|---|---|---|
| *B65G 15/24* | (2006.01) | |
| *B65G 15/12* | (2006.01) | |
| *B65G 15/26* | (2006.01) | |
| *B65G 21/10* | (2006.01) | |
| *B65G 41/00* | (2006.01) | |
| *B65G 15/34* | (2006.01) | |
| *B65G 21/08* | (2006.01) | |

(52) U.S. Cl.
CPC .......... *B65G 15/12* (2013.01); *B65G 15/24* (2013.01); *B65G 15/26* (2013.01); *B65G 21/10* (2013.01); *B65G 15/34* (2013.01); *B65G 21/08* (2013.01); *B65G 41/008* (2013.01); *B65G 2814/0331* (2013.01)

(58) Field of Classification Search
CPC ...... B65G 15/24; B65G 15/26; B65G 41/008; B60P 1/38
USPC .................. 198/313, 314, 595, 812; 414/528
See application file for complete search history.

(56) References Cited

U.S. PATENT DOCUMENTS

| | | | |
|---|---|---|---|
| 2,519,929 | A | 8/1950 | Redler |
| 2,620,226 | A | 12/1952 | Jones |

(Continued)

FOREIGN PATENT DOCUMENTS

CA 2820204 12/2014

OTHER PUBLICATIONS

Dwyer Model PLS2 Paddle Level Switch brochure, 2014 from file ://?C:/Users/mhageman/Desktop/DWYER%20L_PLS2_rev2%20NPL.pdf (Year 2014).

*Primary Examiner* — Joseph A Dillon, Jr.
(74) *Attorney, Agent, or Firm* — Clayton, McKay & Bailey, PC

(57) ABSTRACT

The present disclosure is directed toward a two-conveyor mechanical conveyor belt system for granulated raw materials including a first conveyor that may be larger than a second conveyor. Both conveyors are configured to be mounted onto a mobile base such that the conveyor system has dimensions similar to a trailer for conventional cargo transport truck. The conveyor system may be used for loading and unloading granulated raw materials, preferably silica sand, into transporting trailers that are suitable for feedstock. The longer-length conveyor belt of the first conveyor defines a transporting belt. The second conveyor may be configured to be positioned between the first conveyor and a trailer, and includes a shorter-length belt that defines a connecting belt disposed between the first conveyor and the trailer. The configuration of the first and second conveyors provides an airtight or otherwise sealed connection between a raw materials-transporting trailer and a specialized container.

20 Claims, 20 Drawing Sheets

(56) References Cited

U.S. PATENT DOCUMENTS

| | | | |
|---|---|---|---|
| 2,880,849 A * | 4/1959 | Craggs | B65G 21/14 |
| | | | 198/313 |
| 3,310,345 A | 3/1967 | Rowden | |
| 3,361,478 A | 1/1968 | Ross, Jr. | |
| 3,402,805 A * | 9/1968 | Spellman, Jr. | B28C 5/4255 |
| | | | 198/313 |
| 3,595,175 A | 7/1971 | Austill | |
| 3,613,866 A * | 10/1971 | Arndt | B65G 21/14 |
| | | | 198/313 |
| 3,692,363 A | 9/1972 | Tenebaum | |
| 3,788,452 A * | 1/1974 | McWilliams | B65G 21/14 |
| | | | 198/313 |
| 3,826,353 A * | 7/1974 | Greasley | B65G 15/26 |
| | | | 198/302 |
| 3,938,861 A | 2/1976 | Bagwell | |
| 3,945,484 A * | 3/1976 | Oury | B65G 21/14 |
| | | | 198/313 |
| 4,009,906 A | 3/1977 | Sweet | |
| 4,058,198 A * | 11/1977 | O'Neill | B65G 15/24 |
| | | | 198/313 |
| 4,342,267 A | 8/1982 | Blout | |
| 4,348,047 A | 9/1982 | Harshman | |
| 4,475,672 A | 10/1984 | Whitehead | |
| 4,505,512 A | 3/1985 | Schmeichel | |
| 4,523,669 A * | 6/1985 | Smith | B65G 21/14 |
| | | | 198/313 |
| 4,691,957 A | 9/1987 | Ellingson | |
| 4,747,244 A | 5/1988 | Christianson | |
| 4,813,839 A * | 3/1989 | Compton | B65G 41/002 |
| | | | 180/209 |
| 5,046,432 A | 9/1991 | Bowler | |
| 5,203,442 A * | 4/1993 | Oury | B28C 5/4255 |
| | | | 198/313 |
| 5,326,156 A | 7/1994 | Heider | |
| 5,465,830 A * | 11/1995 | Tingskog | B65G 67/606 |
| | | | 198/819 |
| 5,498,119 A * | 3/1996 | Faivre | B60P 1/36 |
| | | | 198/313 |
| 5,669,562 A * | 9/1997 | Smith | B02C 18/2241 |
| | | | 241/101.74 |
| 5,782,524 A | 7/1998 | Heider | |
| 6,059,372 A | 5/2000 | McDonald | |
| 6,135,534 A | 10/2000 | Schmeichel | |
| 6,283,269 B1 * | 9/2001 | Mayer | B65G 41/005 |
| | | | 198/313 |
| 6,378,686 B1 * | 4/2002 | Mayer | B65G 21/14 |
| | | | 198/314 |
| 6,401,983 B1 | 6/2002 | McDonald | |
| 6,749,268 B1 | 6/2004 | Wheeler | |
| 6,929,113 B1 * | 8/2005 | Hoover | B65G 21/14 |
| | | | 198/313 |
| 8,025,140 B2 * | 9/2011 | Whyte | B02C 21/026 |
| | | | 198/313 |
| 8,132,659 B2 * | 3/2012 | Coers | A01D 41/1217 |
| | | | 198/303 |
| 8,944,740 B2 | 2/2015 | Teichrob | |
| 9,315,294 B2 | 4/2016 | Herman | |
| 9,428,348 B2 | 8/2016 | Teichrob | |
| 9,688,469 B2 | 6/2017 | Sheesley | |
| 9,758,082 B2 | 9/2017 | Eiden, III | |
| 10,059,245 B2 | 8/2018 | Goedken | |
| 10,351,043 B1 | 7/2019 | Kibler | |
| 2002/0121532 A1 | 9/2002 | Kassian | |
| 2004/0031662 A1 * | 2/2004 | Jacoba Dekoning | B65G 21/14 |
| | | | 198/313 |
| 2004/0060798 A1 * | 4/2004 | Grundl | E01C 19/48 |
| | | | 198/314 |
| 2004/0178233 A1 | 9/2004 | Medemblik | |
| 2005/0168047 A1 | 8/2005 | Grier | |
| 2009/0071797 A1 * | 3/2009 | Frankl | B65G 15/26 |
| | | | 198/313 |
| 2009/0078410 A1 | 3/2009 | Krenek | |
| 2009/0085394 A1 | 4/2009 | Lemmons | |
| 2010/0270848 A1 | 10/2010 | Heider | |
| 2011/0253503 A1 * | 10/2011 | Mackin | B65G 15/26 |
| | | | 198/313 |
| 2012/0048674 A1 * | 3/2012 | Smith | B65G 41/002 |
| | | | 198/306 |
| 2015/0353291 A1 * | 12/2015 | Teichrob | B65G 41/001 |
| | | | 701/24 |
| 2016/0130095 A1 | 5/2016 | Oren | |
| 2019/0225429 A1 * | 7/2019 | McCloskey | B65G 41/002 |

* cited by examiner

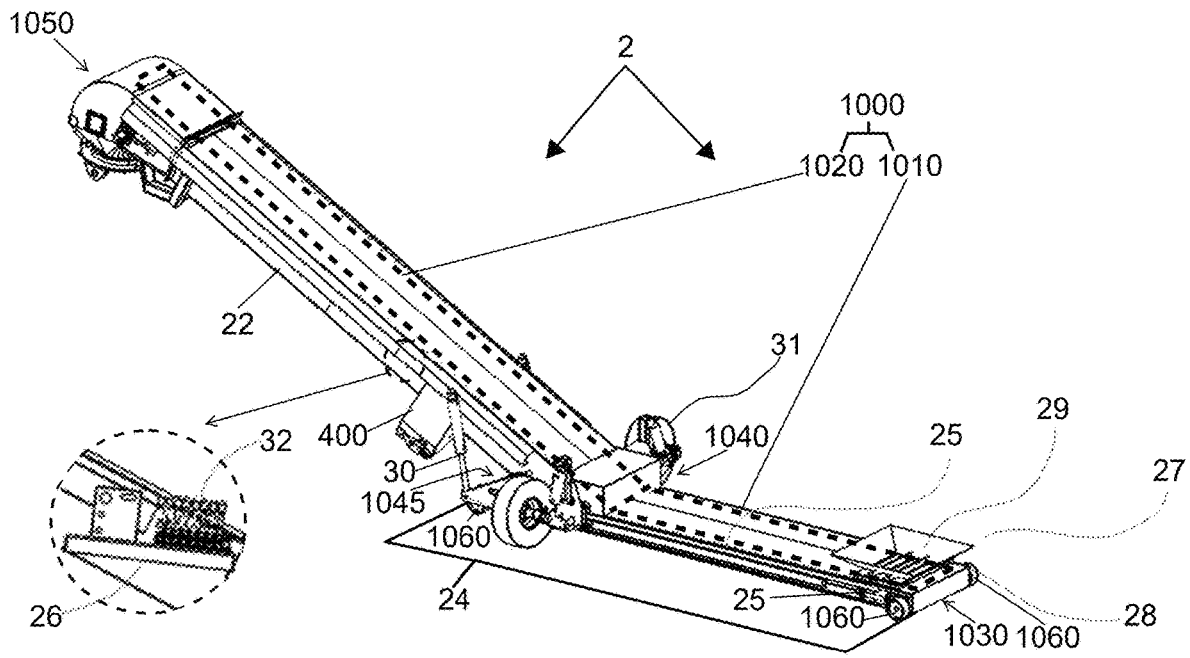
Fig. 10B  Fig. 10A
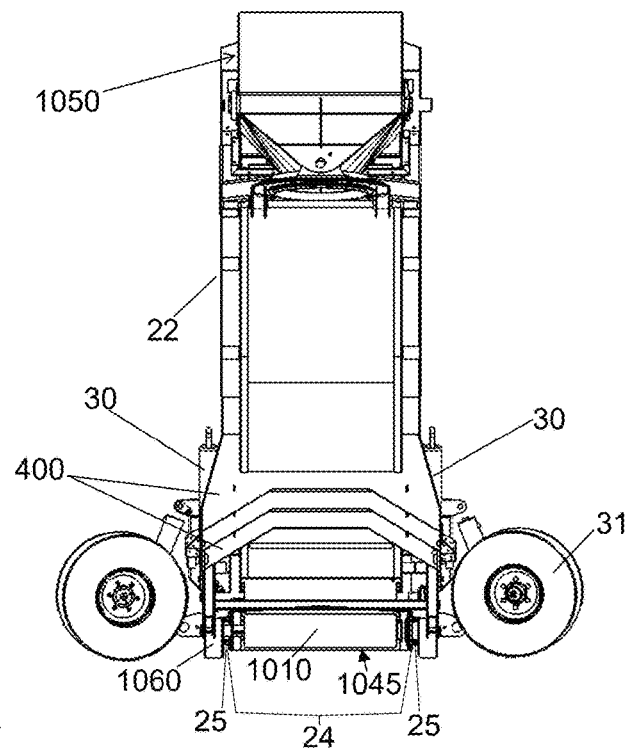
Fig. 10C

MECHANICAL CONVEYOR BELTS FOR GRANULATED RAW MATERIALS

This application claims priority to Mexican Patent Application No. MX/U/2018/000009, filed Jan. 10, 2018, which is expressly incorporated by reference herein.

RELATED APPLICATIONS

This application claims priority to Mexican Patent Application No. MX/U/2018/000009, filed Jan. 10, 2018, which is expressly incorporated by reference herein.

FIELD OF THE PRESENT DISCLOSURE

The present disclosure is directed toward a mechanical conveyor belt system that is configured to provide an airtight or otherwise sealed connection between a raw materials-transporting trailer and a specialized container, and includes specific features that allow clean and waste-free movement of raw materials, preferably silica sand of different sizes.

BACKGROUND

Related technologies differ from the systems of the present disclosure both in form and function. For example, these related technologies are shorter, narrower, and take longer to move raw materials, and therefore yield inferior performance.

In addition, in some related technologies, a device including a band, such as conveyor, must be loaded onto a platform dedicated for device transport, and unloaded from the platform upon arrival to destination operation. In addition, in related technologies, material is evacuated at high speeds from a device and lands on a hatch of container.

SUMMARY

In contrast to the related technologies previously discussed, systems of the present disclosure include conveyors coupled to a trailer whose content the conveyors will receive. In addition, the manner in which a telescopic belt of a first conveyor of the system of the present disclosure discharges into the container is different from the way in which material is evacuated and lands on a container hatch in related technologies. More specifically, in one example, a first conveyor of the system of the present disclosure includes a belt that is coupled at one end to an escape nozzle of a container for material, for example a raw material such as silica sand. As a result, a cleaner unloading of material is achieved. In yet another example, a smaller belt of a second conveyor of the conveyor belt system according to the present disclosure can include sheathing placed at a point of contact between a chute and the second smaller belt. In turn, production of dust can be prevented.

BRIEF DESCRIPTION OF THE DRAWINGS

FIG. 10A illustrates an isometric view of a second conveyor in an operational position;

FIG. 10B illustrates a close-up of the secondary control system for a second conveyor and corresponds to detail 10B of FIG. 4.

FIG. 10C illustrates a front elevation view of a second conveyor in an operational position;

DETAILED DESCRIPTION

Figure 1:
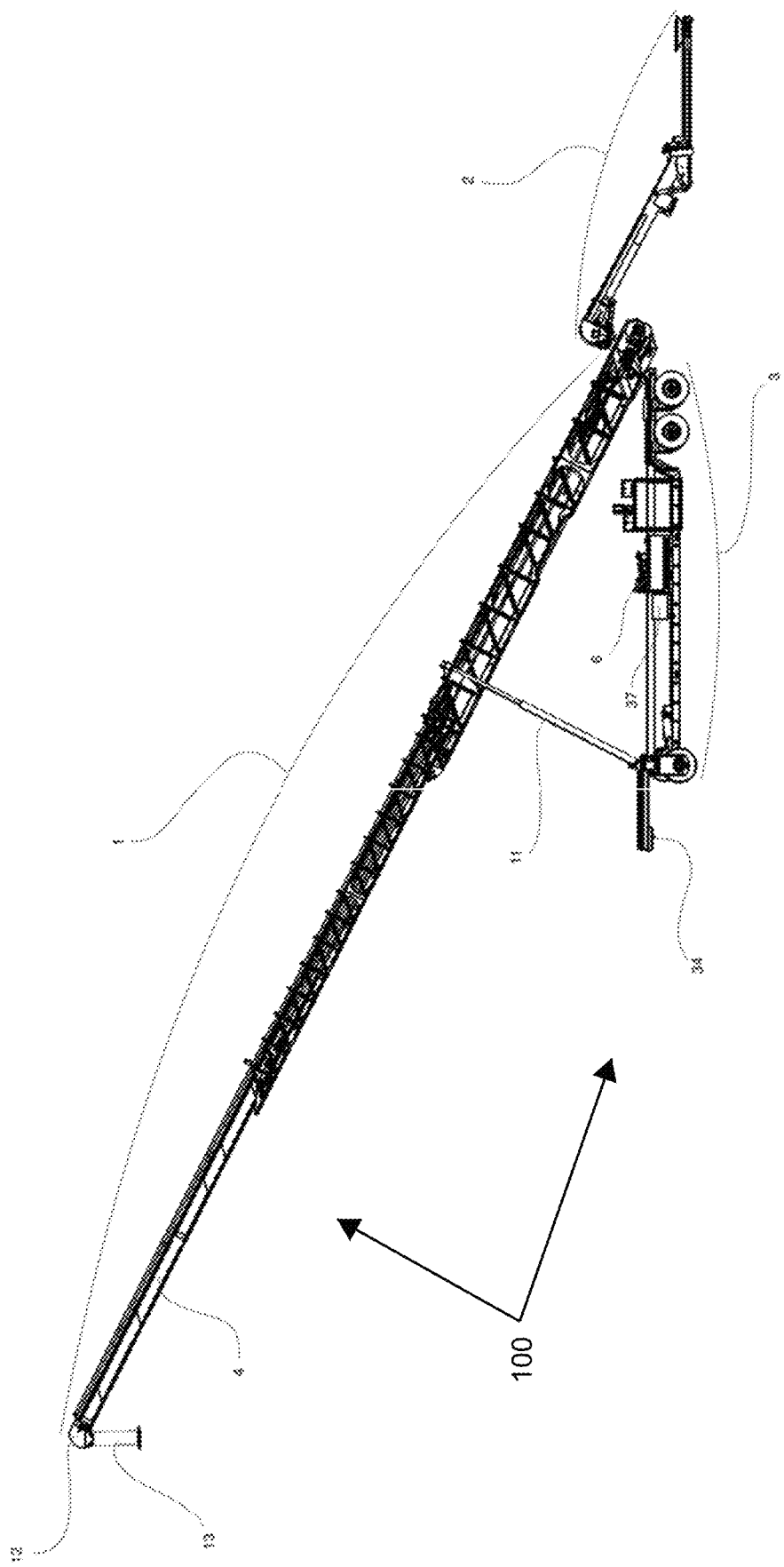
FIG. 1 illustrates a side view of a mechanical conveyor belt system for granulated raw materials, according to the present disclosure.

The present disclosure is directed toward a two-conveyor mechanical conveyor belt system for granulated raw materials 100 ("conveyor system 100"). A first conveyor 1 of the conveyor system 100 is larger than a second conveyor 2. The first and second conveyors 1, 2 are configured to be mounted onto a mobile base 3, such that the conveyor system 100 has dimensions similar to a trailer for conventional cargo transport truck. The conveyor system 100 is configured to be used for loading and unloading granulated raw materials (hereafter referred to as "raw material," "feedstock," "sand," or "silica sand"), preferably silica sand, into transporting trailers (not shown) that are suitable for feedstock. According to an aspect of the present disclosure, the longer-length conveyor belt of the first conveyor 1 defines a transporting belt 300 illustrated in FIG. 3. The second conveyor 2 is configured to be positioned between the first conveyor 1 and a trailer (not shown), as illustrated in FIGS. 1, 2, 6, 9, and 11, and includes a shorter-length belt that defines a connecting belt 1000, which is illustrated in phantom in FIG. 10.

Figure 2A:
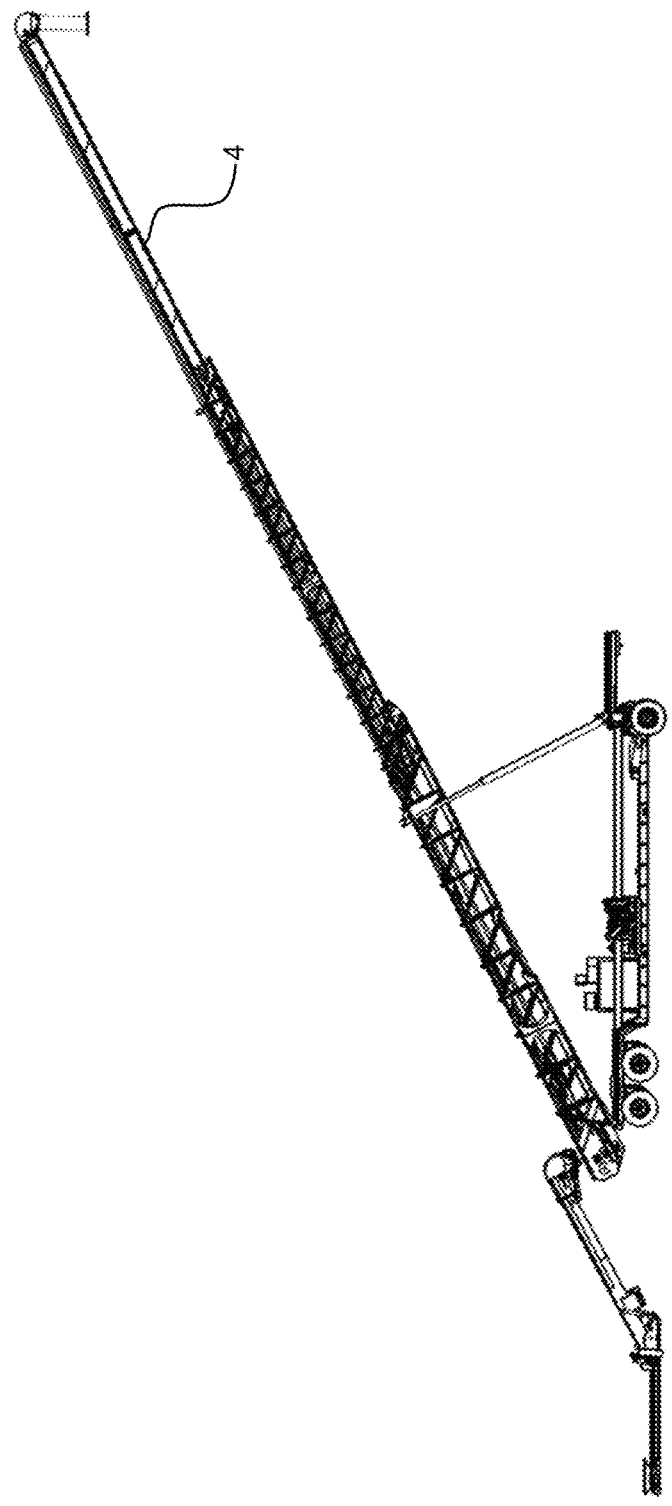
FIGS. 2A and 2B respectively illustrate side views of a mechanical conveyor belt system in an expanded and contracted mode.
Figure 2B:
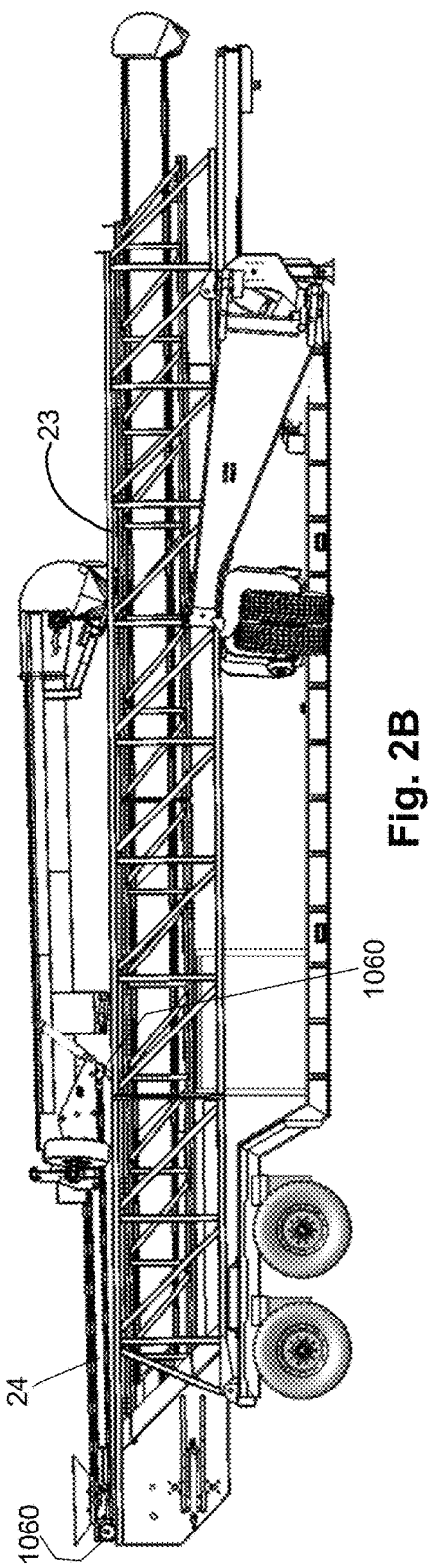

Turning to FIGS. 2A and 2B, the longer transporting belt 300 of the first conveyor 1 has a telescopic function. More specifically, the transporting belt 300 of first conveyor 1 extends and contracts lengthwise under the control of a primary control and monitoring system 800 ("primary control system 800"), which is illustrated in FIG. 8 and further described below. The transporting belt 300 is designed to carry granulated raw materials from a specialized trailer (not shown) to a specialized container (see FIG. 6). At least a portion of the transporting belt 300 is fitted within a protective structure 4 illustrated in FIGS. 1, 2A, 2B, 6, and 7. The protective structure 4 is coupled to the transporting belt 300 of the first conveyor 1 in such a way so as to form a structure similar to a tunnel. As a result, the protective structure 4 avoids unwanted exposure, of raw material being carried by the first conveyor 1, to an exterior environment surrounding the conveyor system 100, and prevents the production of dust during the transfer of the raw material.

Figure 3:
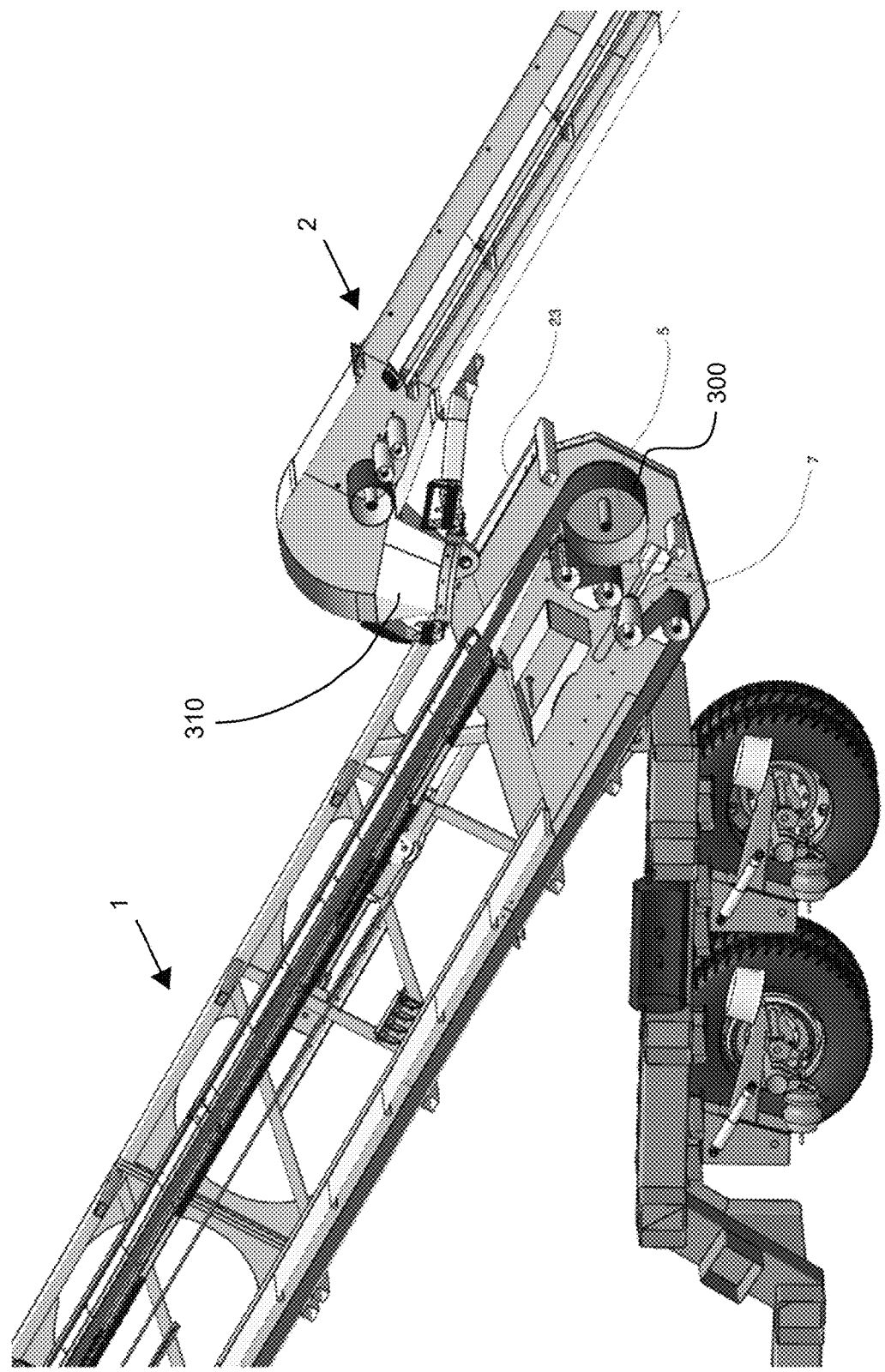
FIG. 3 illustrates an internal view of a first conveyor and a second conveyor of a mechanical conveyor belt system according to the present disclosure, and shows a combined conveying action mechanism.

Turning now to FIG. 3, the transporting belt 300 of the first conveyor 1 is a continuous belt that may include an external surface provided with a texturized pattern that allows for effective and reliable transfer of the raw material. As is clear from FIG. 3, the transporting belt 300 can receive raw material from a discharge chute 310 of the second conveyor 2.

Figure 4:
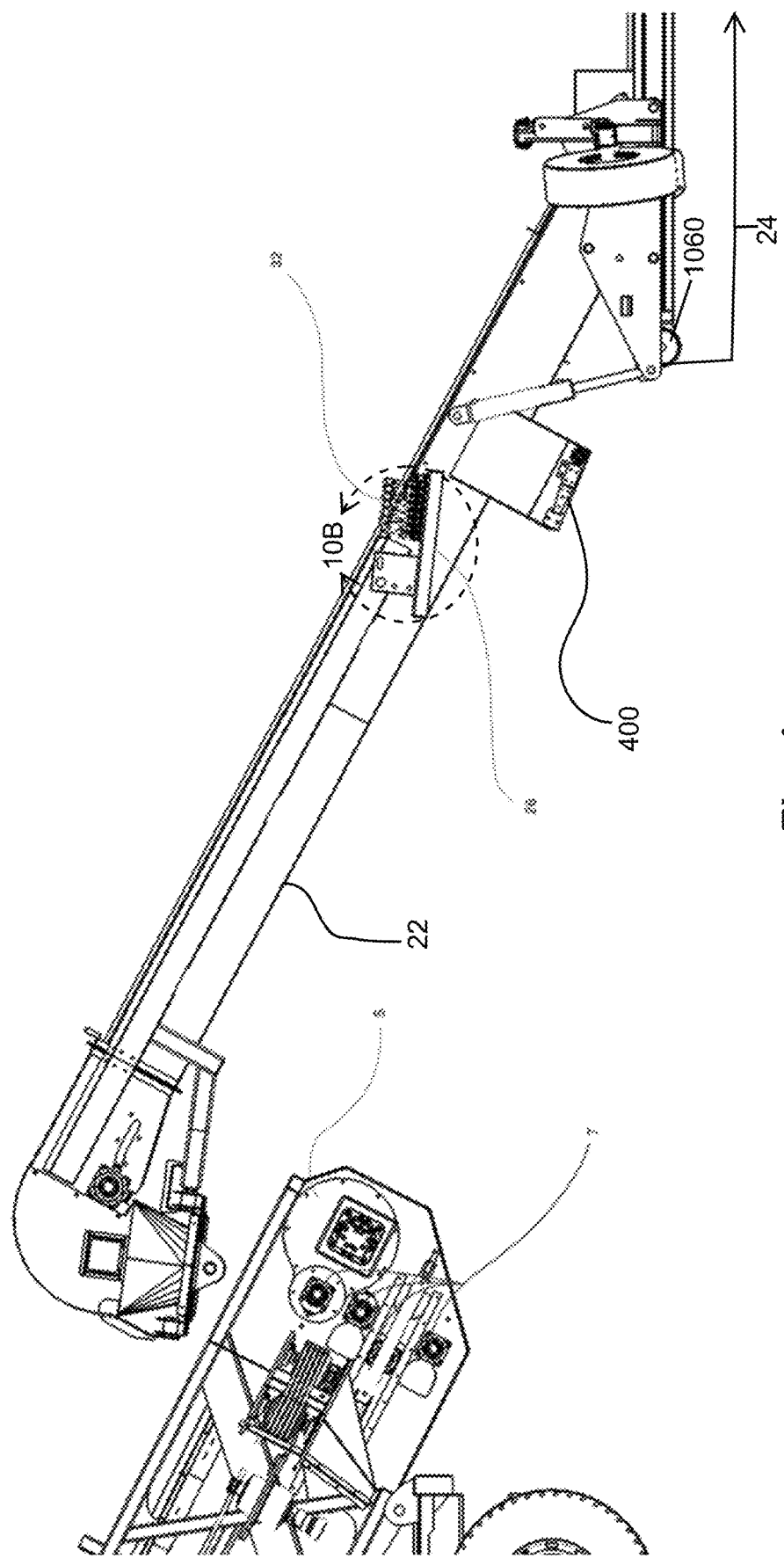
FIG. 4 illustrates an internal side view of a first conveyor that shows a portion of a respective conveying action mechanism, and a side view of a second conveyor of a mechanical conveyor belt system, according to the present disclosure.

As one of ordinary skill in the art will appreciate with a review of respective portions of the transporting belt 300 illustrated in FIGS. 3 and 4, the transporting belt 300 is drawn by friction between a plurality of internal drums. A first drum 5 may be actuated by a central engine 6. Further, the first conveyor 1 may include a plurality of second drums 7 that are free-rolling, may not include an actuating mechanism, and function to serve as a return point for the transporting belt 300. In one example, the first conveyor 1 includes five (5) second drums. In addition, the first conveyor 1 may include a pair of motorized rails 23 as shown in FIG. 3, that are configured to engage with arms 400 illustrated in FIG. 4 as extending from each side of a protective covering 22 of the second conveyor. An engagement between the motorized rails 23 and the arms 400 can also be observed in FIGS. 15, 16, 18, and 19.

Figure 5:
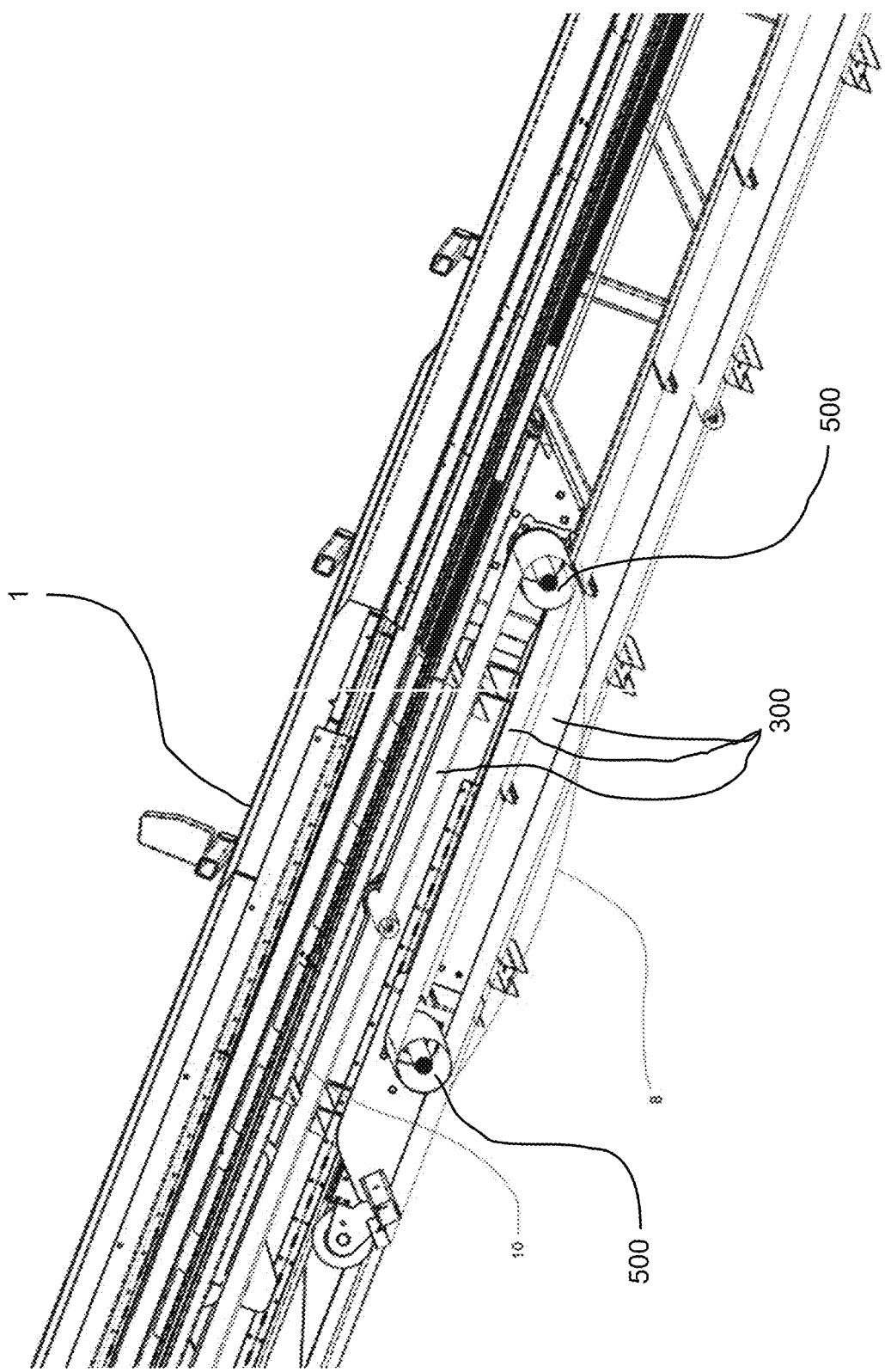
FIG. 5 illustrates an internal side view of a first conveyor that shows a portion of a respective conveying action mechanism.

Turning to FIG. 5, the transporting belt 300 may be fitted with a plurality of rollers 50 in a middle section 8 of a respective continuous path. In one example, the transporting belt 300 may be fitted with at least two rollers 500, as illustrated in FIG. 5, which enable the transporting belt 300 to extend and contract as needed. In addition, the rollers 500 support and prevent the transporting belt 300 from losing its shape. A width of the transporting belt 300 is preferably, but not limited to, 18 inches. Further, the transporting belt 300 is preferably made of a material capable of withstanding the load, tensions, and other wearing-down forces that conventional raw material conveyor belts, such as those of related technologies previously discussed, are normally subject to. In one non-limiting example, the transporting belt 300 may be formed from a synthetic plastic fabric.

Figure 6:
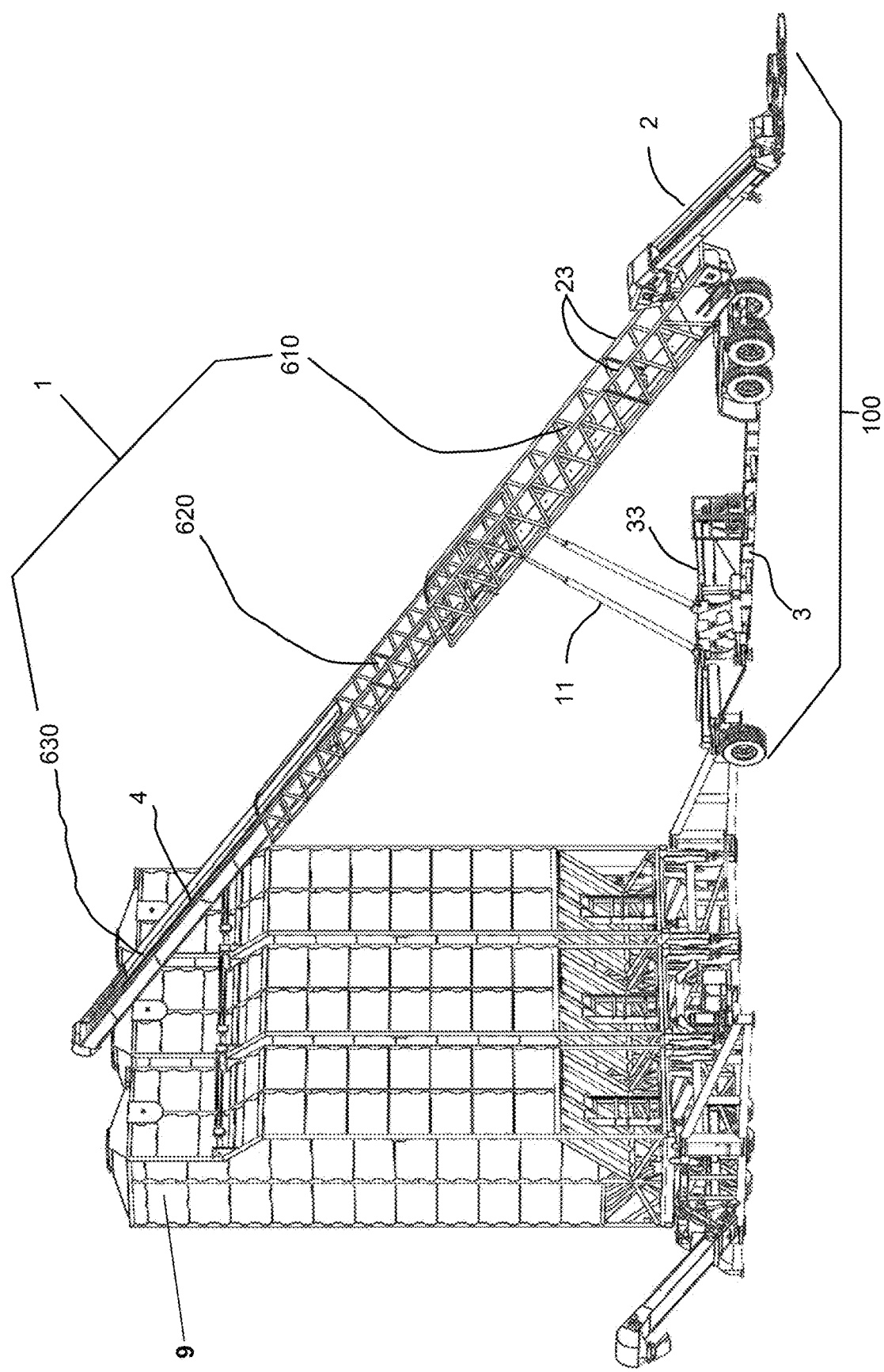
FIG. 6 illustrates an isometric view of an exemplary implementation of a mechanical conveyor belt system for granulated raw materials, according to the present disclosure.

As can be seen with reference to FIG. 6, the transporting belt 300 and the protective structure 4 of the first conveyor 1 can be divided first, second, and third sections 610, 620, 630. The third section 630 including, or otherwise being defined by the protective structure 4. Together, the first, second, and third sections 610, 620, 630 can be extended and contracted along a longitudinal axis of the first conveyor 1. In a contracted mode, the transporting belt 300 is fitted to the dimensions of the mobile base 3 by way of an internal roller chain 10, which is shown in FIG. 5. The internal roller chain 10 functions to relocate the transporting belt 300 from one place to another. In operation, the first, second, and third sections 610, 620, 630 may be collectively extended over three extension phases that once completed, enable the transporting belt 300 to connect to any of a plurality of specialized containers 9. In FIG. 6, the first conveyor 1 is connected to a middle one of the three specialized containers 9. Thus, the first conveyor 1 is in a configuration that enables the transporting belt 300 to transfer feedstock to the second conveyor 2 to the middle specialized containers 9.

As previously noted, extension and contraction movement of the first, second, and third sections 610, 620, 630 is effected by the roller chain 10. The conveyor system 100 additionally includes two first hydraulic jacks 11 located in a front part of the mobile base 3 as shown in FIG. 6 (see also FIG. 1). The first hydraulic jacks 11 may be leveled with a distal end of the first section 610 of the first conveyor 1. The location of the first hydraulic jacks 11 relative to the first, second, and third sections 610, 620, 630, allow the first conveyor 1, and thus the transporting belt 300, to be tilted to a maximum preferred inclination of 28 degrees relative to the ground. Further, the first hydraulic jacks 11 ensure the first conveyor 1 and the transporting belt can be maintained in a position, or otherwise positioned to relocate the first conveyor 1 over the mobile base 3.

Figure 7:
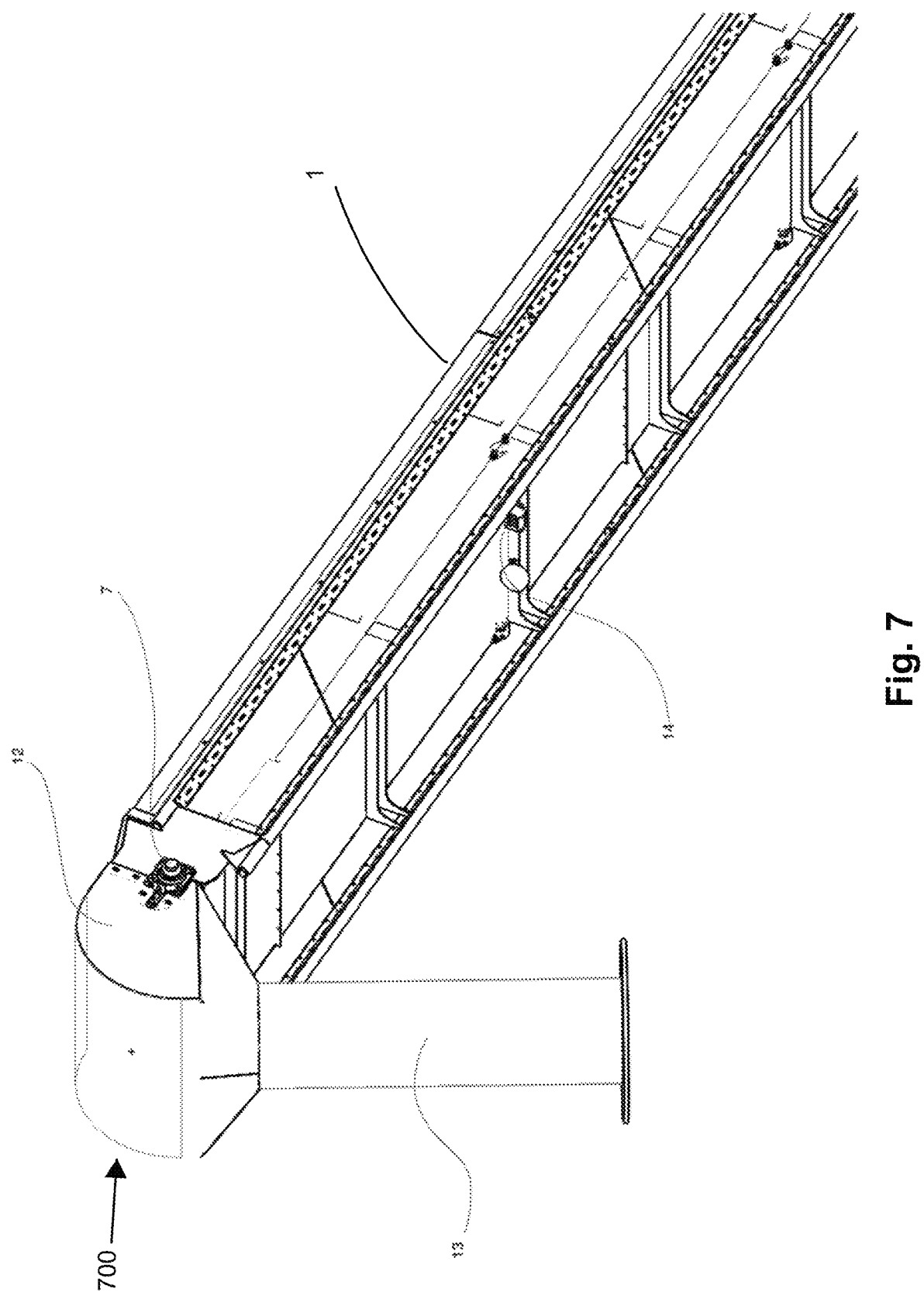
FIG. 7 illustrates an isometric view of a connection nozzle of a first conveyor.
Figure 8:
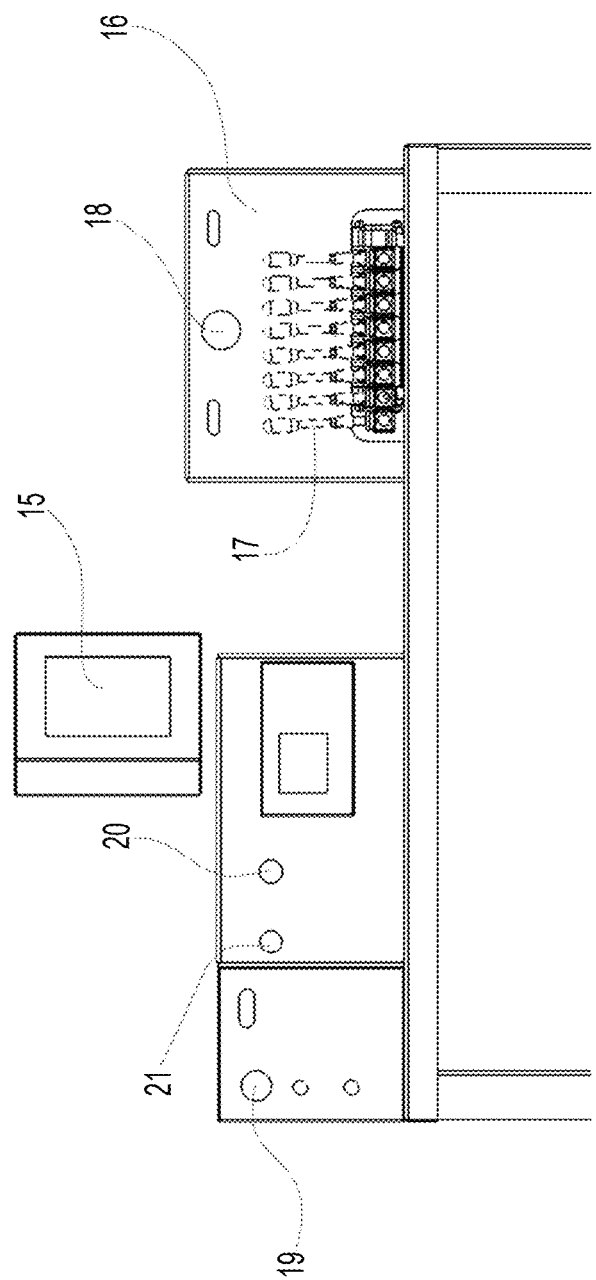
FIG. 8 illustrates a front view of a primary control and monitoring system of a mechanical conveyor belt system.

As illustrated in FIG. 7, a first distal end 700 of the first conveyor 1 is fitted with a completely airtight connection nozzle 12 having an extension 13. In one example, the extension is formed of plastic and in a shape of a cylinder, which allows the extension 13 to be precisely adjusted to a respective specialized container 9, so that discharge of raw material carried by the transporting belt 300 can be initiated and carried out. This results in a clean and waste minimizing product discharge, prevents raw material exposure to environmental elements, such as rain or wind, and minimizes the escape of dust to a surrounding environment. One of ordinary skill in the art will recognize that dust escaping during raw material transfer processes carried out, for example, by the related technologies previously discussed, represents a significant risk to workers, the surrounding infrastructure, and the surrounding community.

With further reference to FIG. 7, a small video camera 14 can be placed just before the connection nozzle 12, and can transmit a respective real-time feed to a monitor 15 of the primary control and monitoring system illustrated in FIG. 8.

As explained now with reference to FIG. 8, the real-time feed of the camera 14 being displayed on the monitor 15, can assist an operator of the conveyor system 100 to direct the movement of the first conveyor 1 using the primary control system 800. As a result, the operator may be able to correctly connect the transporting belt 300 with a desired specialized container 9, and begin a raw material discharge process. Viewed from the first distal end 700 of the first conveyor 1 in a contracted mode, the primary control system 800 can be located, preferably, in a middle of a right side of the mobile base 3 (see FIGS. 9, 11, 15, 18, and 19).

In one example, the primary control system 800 can include a plurality of different levers 17 by which all controllable mechanisms and movements of at least the transporting belt 300, the mobile base 3, and pneumatic stabilizers 33 (see FIGS. 6, 9, 12, and 13) of the mobile base 3 may be actuated and controlled. Exemplary movements of the transporting belt 300 controlled by the primary control system 800 may include elevation and descent of the first conveyor 1 and thus the transporting belt 300; longitudinal contraction and expansion of the transporting belt 300; and lateral advancing and backward movements of the stabilizers for the mobile base 9. This allows the positioning of the transporting belt 300 in a precise manner onto connection line in order to perform the unloading of raw material into one of the specialized containers 9 coupled to the transporting belt 300.

The primary control system 800 is configured to include at least one pressure gauge 18, and a central engine temperature 19 gauge 19. In another example, the primary control system 800 can include an emergency button 20 that is preferably red in color and functions as switch capable of cutting energy from the central engine 6 to the mobile base 3. A pressure release button 21 may also be provided, preferably yellow in color, that functions to release the pressure on the first hydraulic jacks 11. In one example, when the pressure release button 21 is pushed or otherwise implemented, valves incorporated with the first hydraulic jacks 11 are opened to release pressure held therein.

Figure 9:
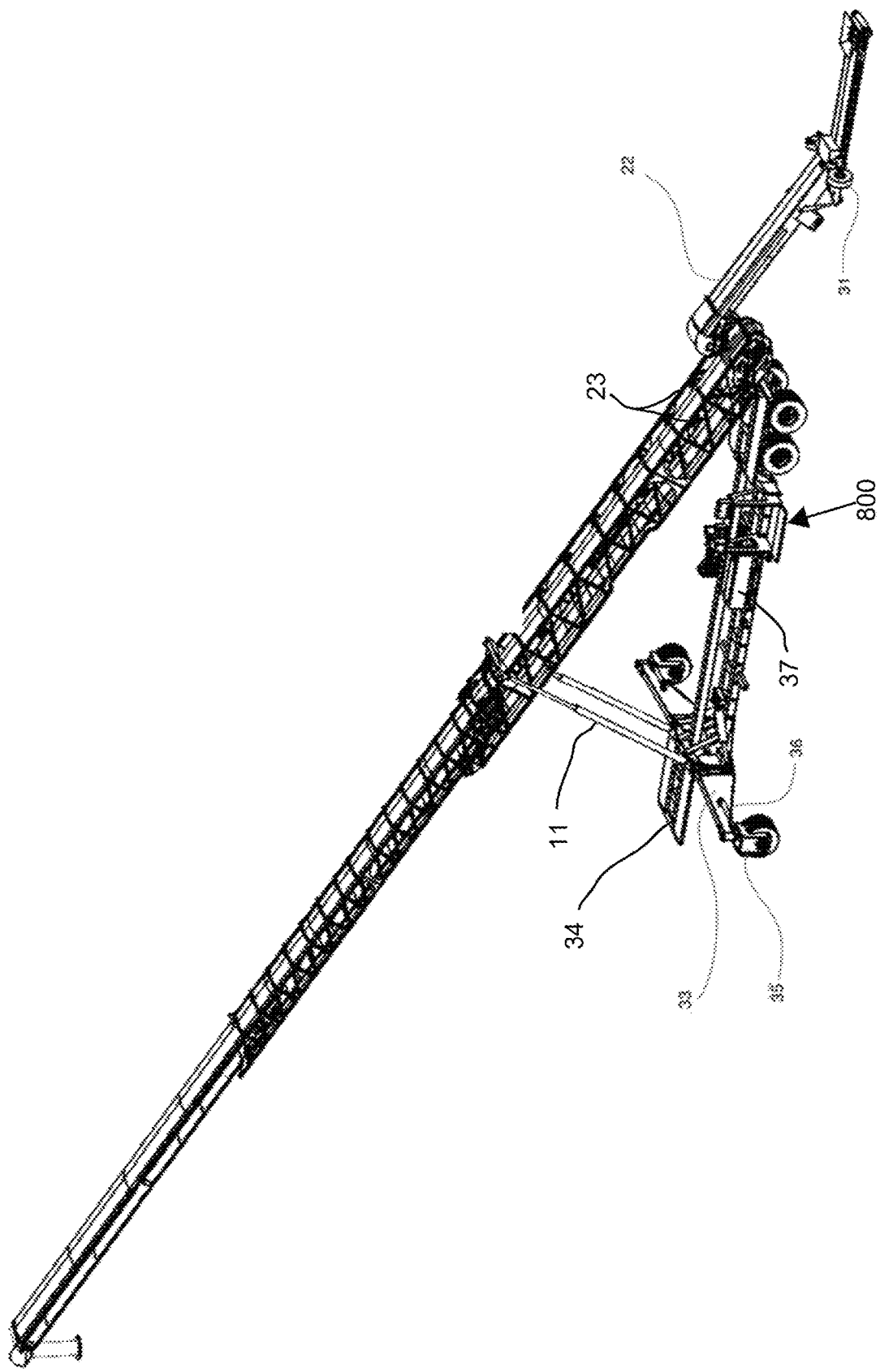
FIG. 9 illustrates an isometric view of a mechanical conveyor belt system, according to the present disclosure.

As illustrated at least in FIGS. 1, 6, and 9, when the conveyor system 100 is in a respective operational configuration, the second conveyor 2 is located in a position relative to the mobile base 3 that is opposite to a direction from the mobile base 3 of a longitudinal extension of the telescoping transporting belt 300. As previously discussed, the belt of the of the second conveyor 2 defines a connecting belt 1000, which is shown in phantom lines in FIGS. 10A and 10E.

Figure 10D:
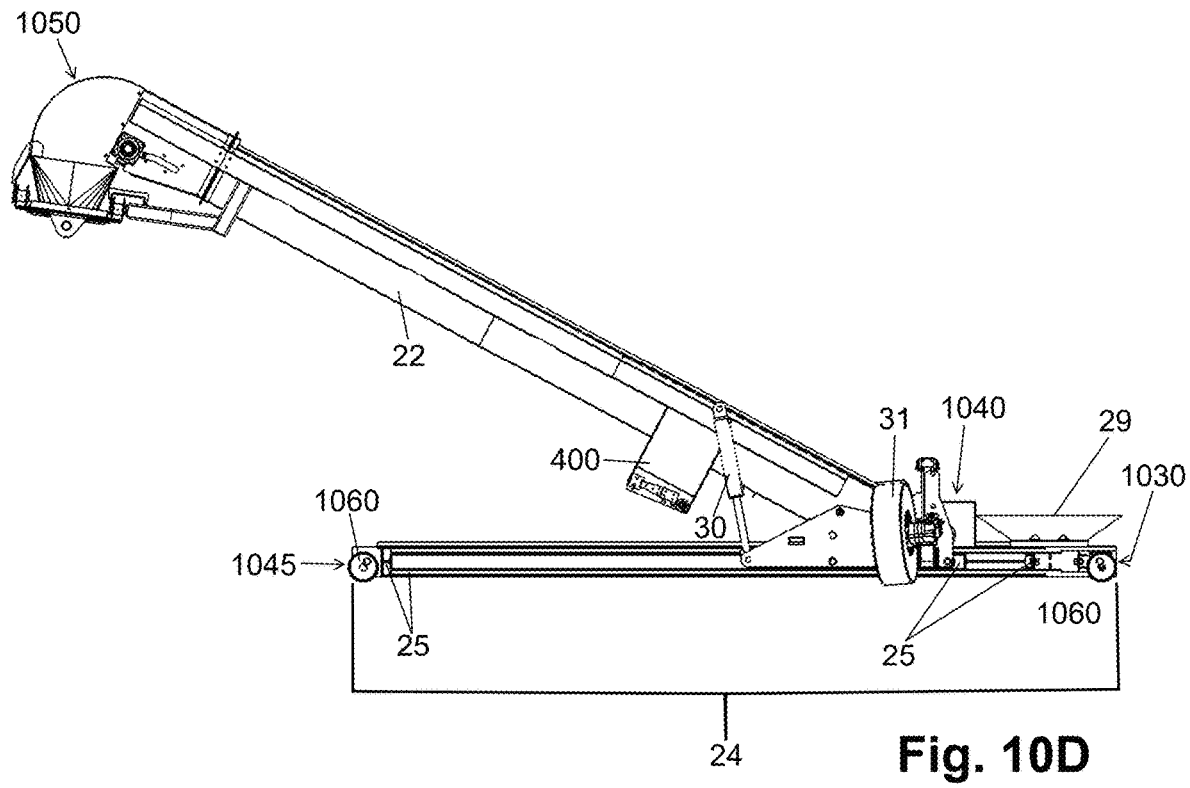
FIG. 10D illustrates a side elevation view of a second conveyor in an operational position.
Figure 10E:
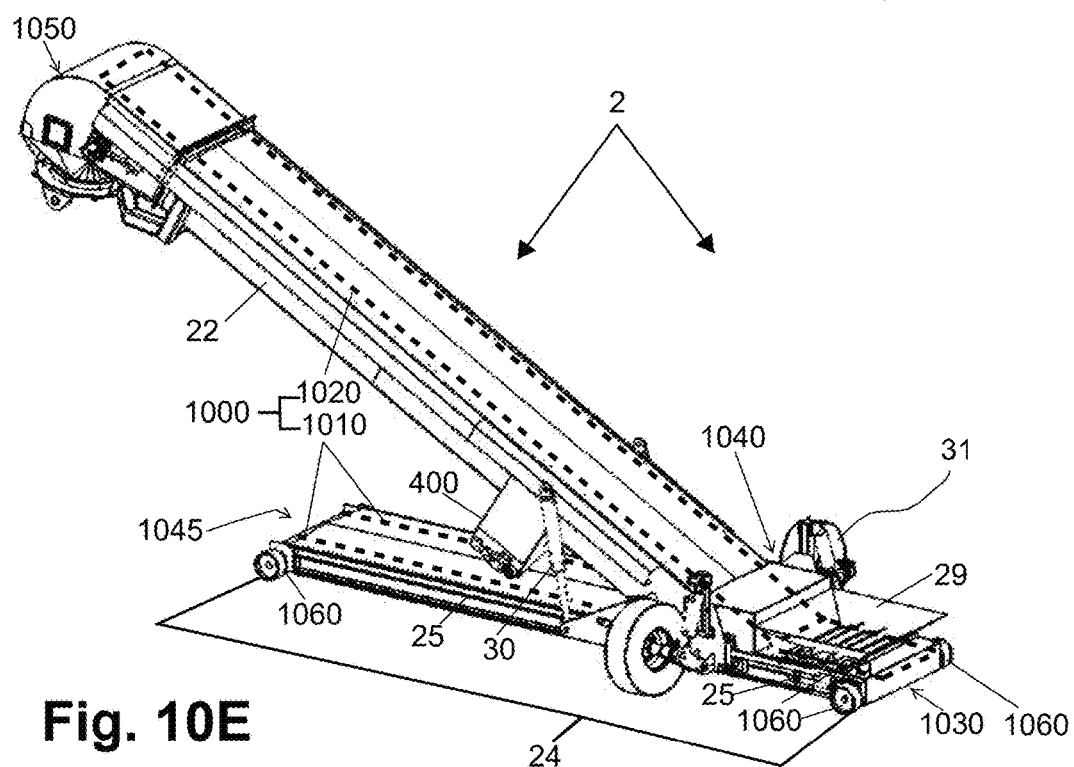
FIG. 10E illustrates an isometric view of a second conveyor in an operational position.
Figure 11:
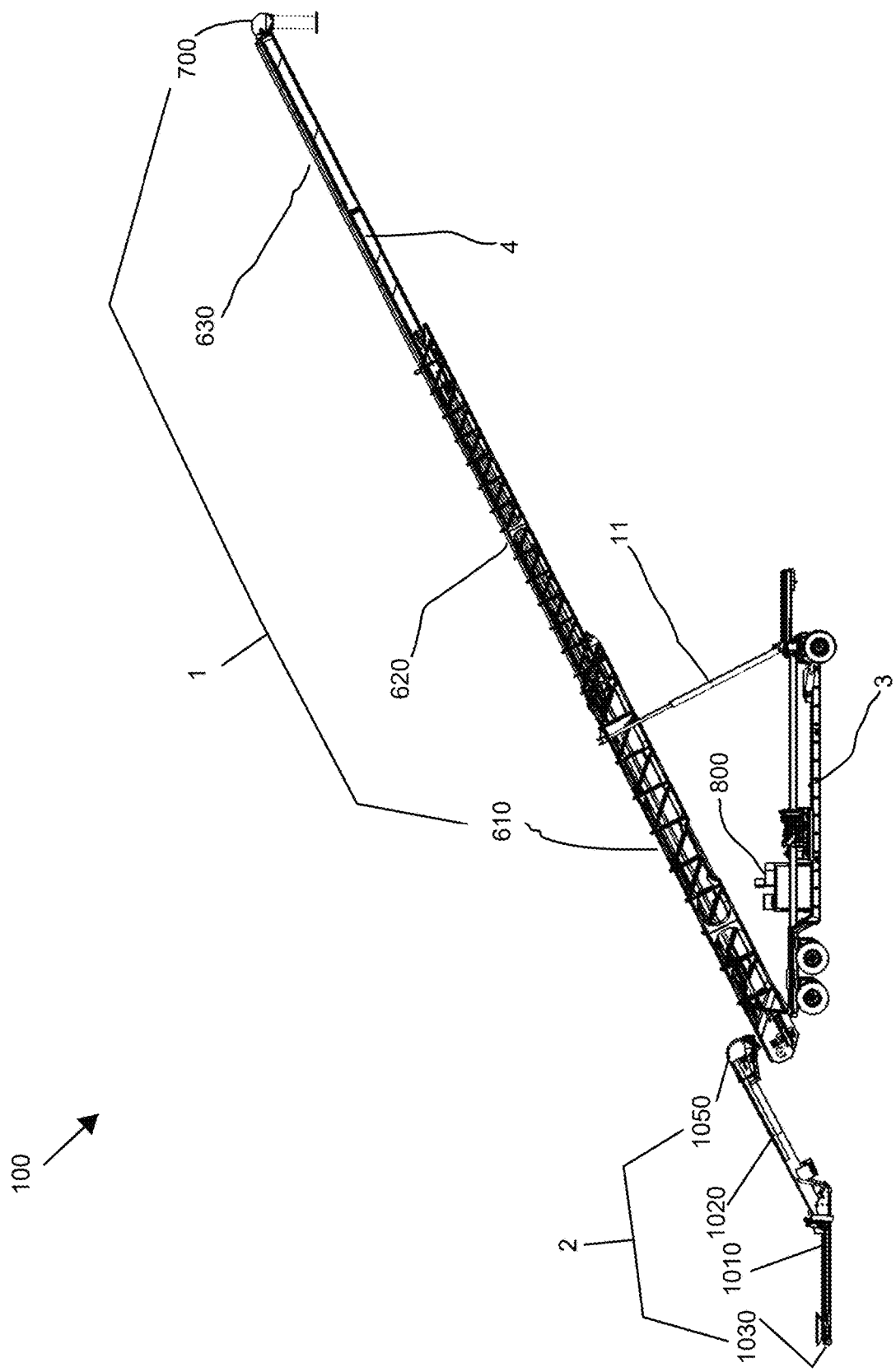
FIG. 11 illustrates a rear view of a mechanical conveyor belt system, according to the present disclosure.
Figure 12:
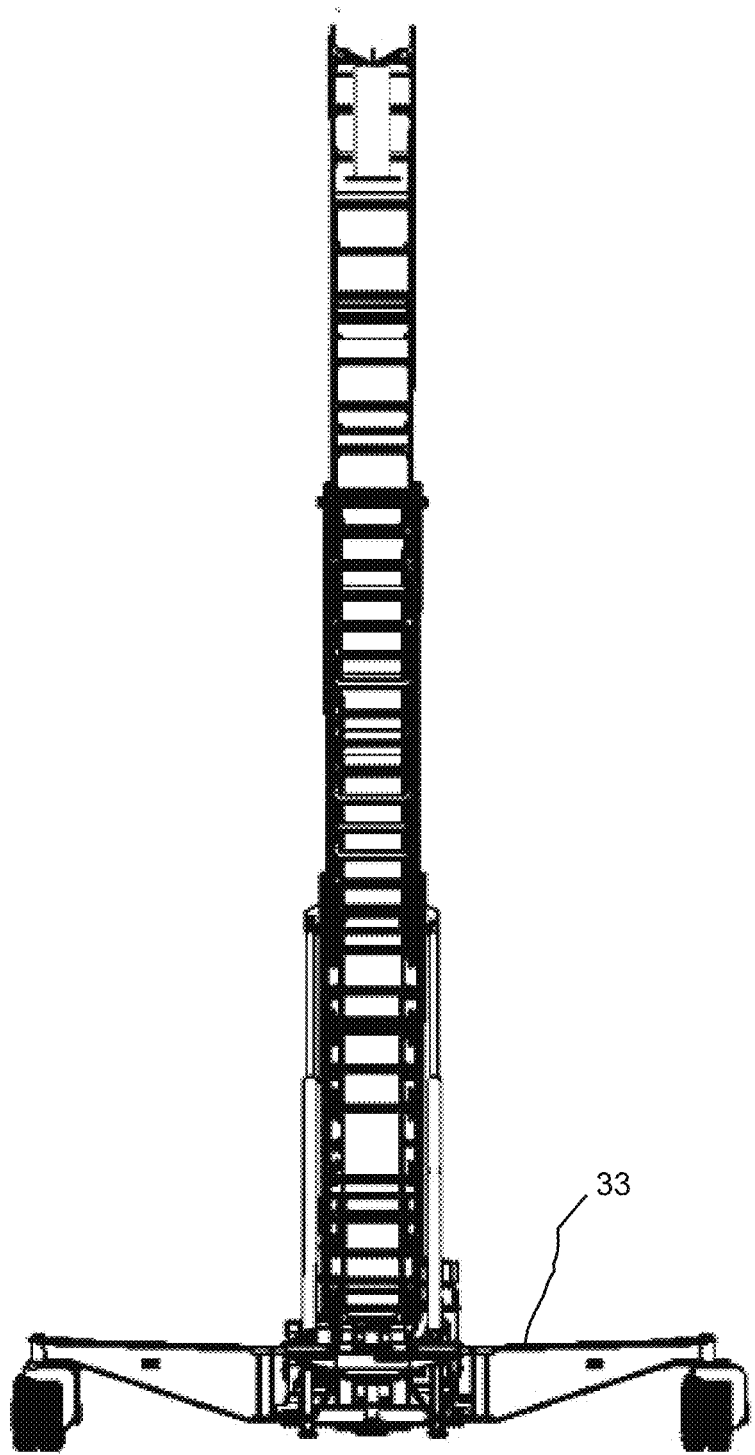
FIG. 12 illustrates a front view of a mechanical conveyor belt system, according to the present disclosure.

As illustrated in FIGS. 10A and 10E, the connecting belt 1000 includes first and second belt regions that respectively define a receiving region 1010, and a transfer region 1020. The receiving region 1010 extends from a proximal end 1030 of the second conveyor 2 to a second distal end 1045, and traverses a transition section 1040 of the second conveyor 2. The receiving region 1010 is configured to be positioned substantially parallel to a longitudinal axis of the mobile base 3 in an operational position. The transfer region 1020 extends from the transition section 1040 to a third distal end 1050 of the second conveyor 2. The connecting belt 1000 provides a connection between a trailer (not shown) and the transporting belt 300 of the first conveyor 1.

Figure 15:
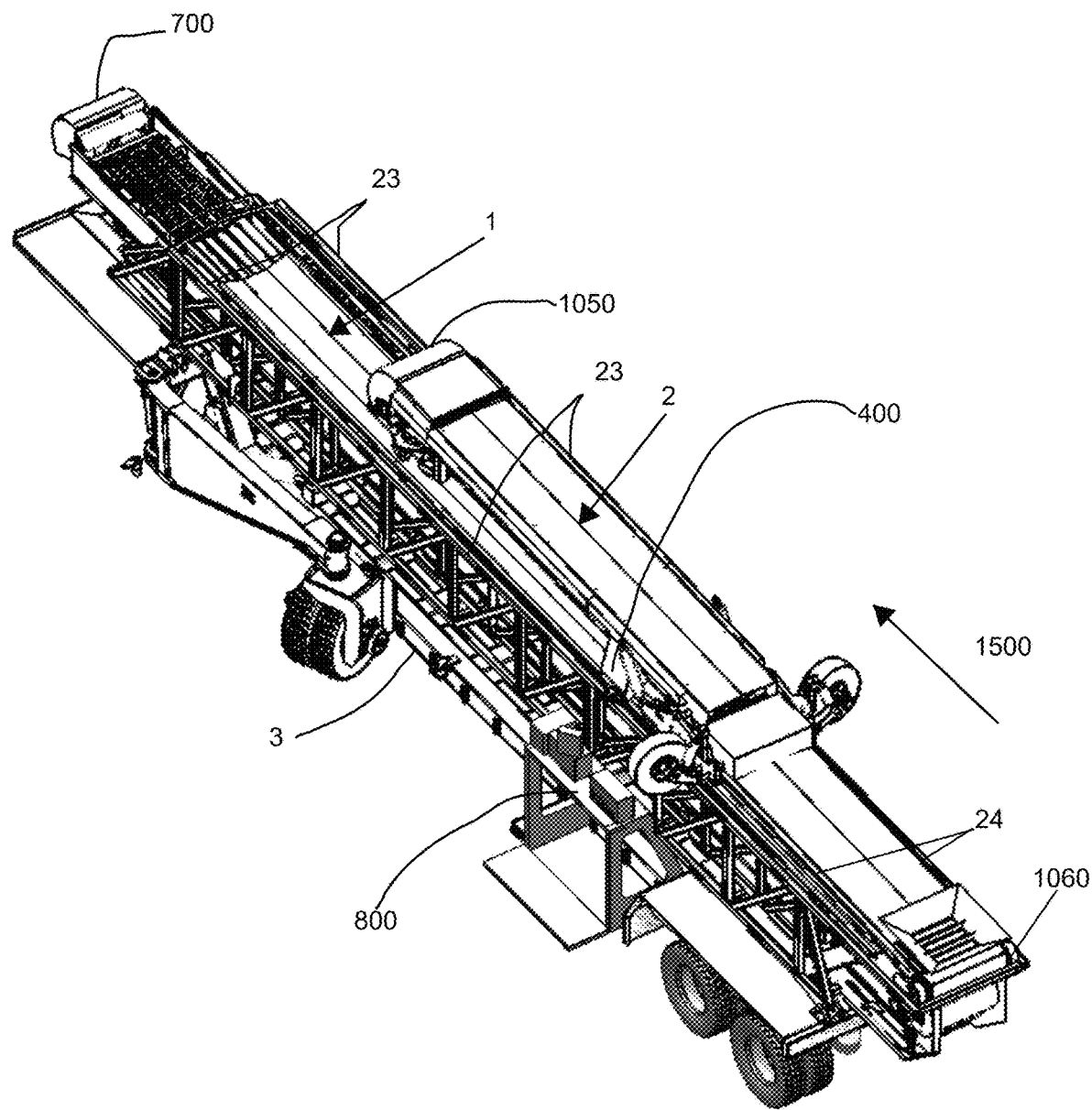
FIG. 15 illustrates an upper isometric view of a mechanical conveyor belt system, according to the present disclosure.
Figure 16:
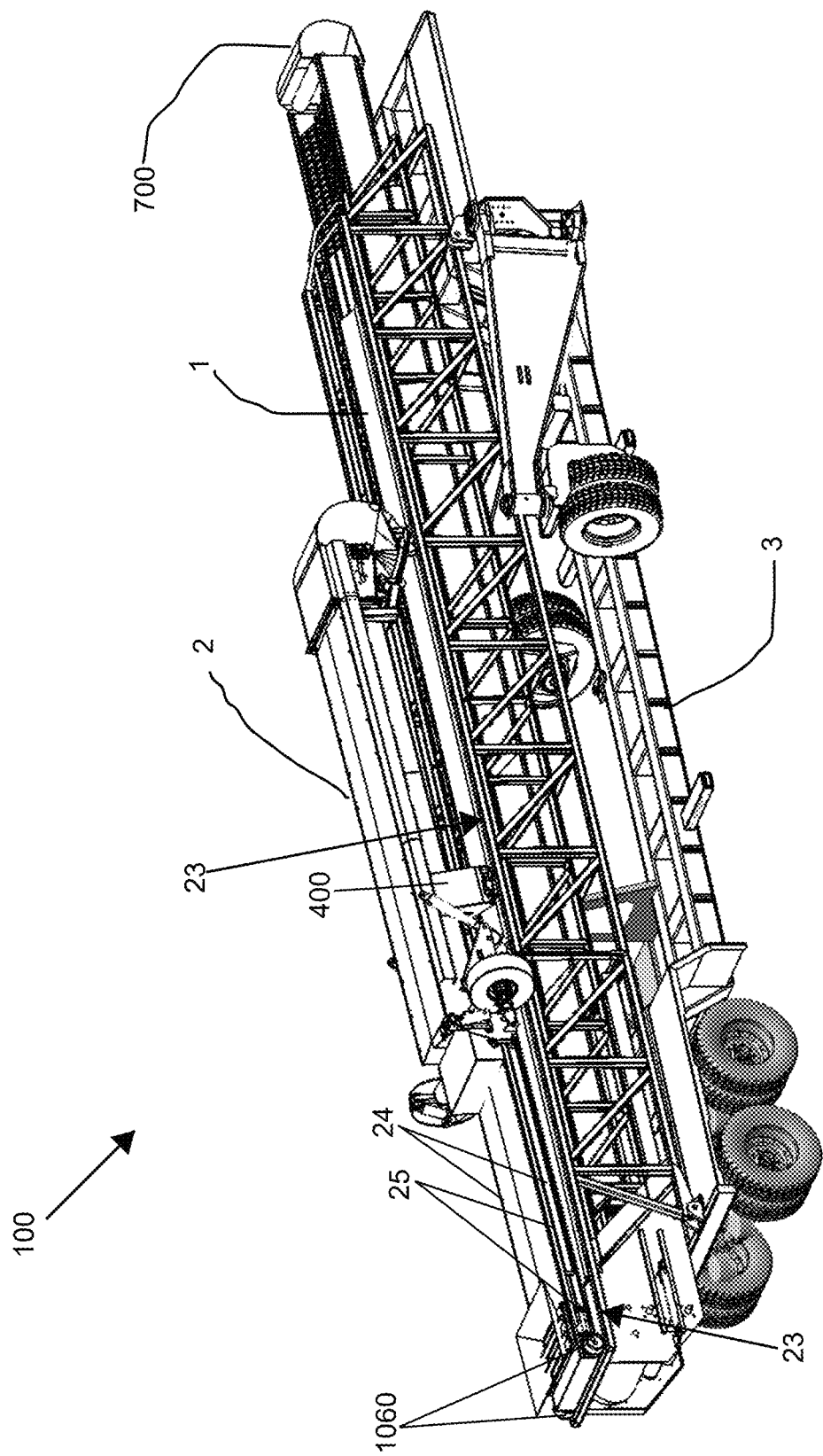
FIG. 16 illustrates a lateral isometric view of a mechanical conveyor belt system in a contracted mode.
Figure 17:
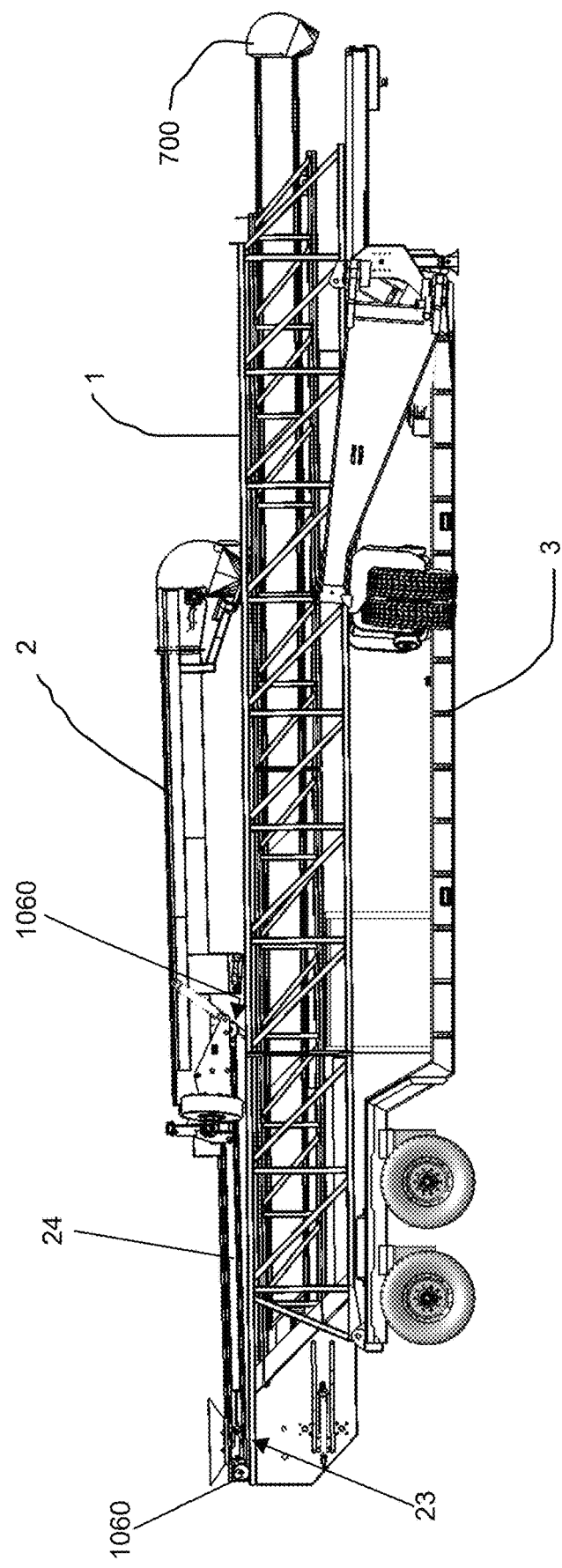
FIG. 17 illustrates a side view of a mechanical conveyor belt system in a contracted mode.
Figure 18:
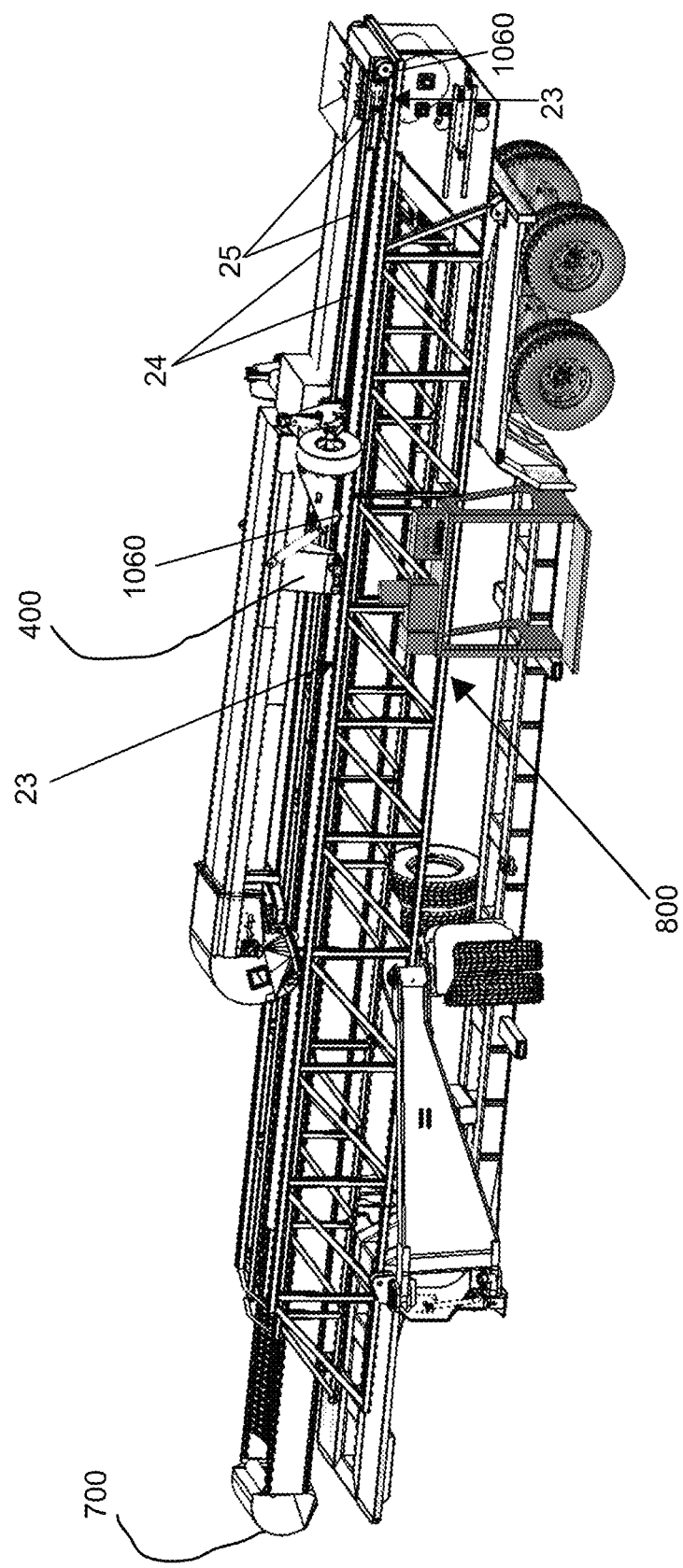
FIG. 18 illustrates a lateral isometric view of a mechanical conveyor belt system in a contracted mode.
Figure 19:
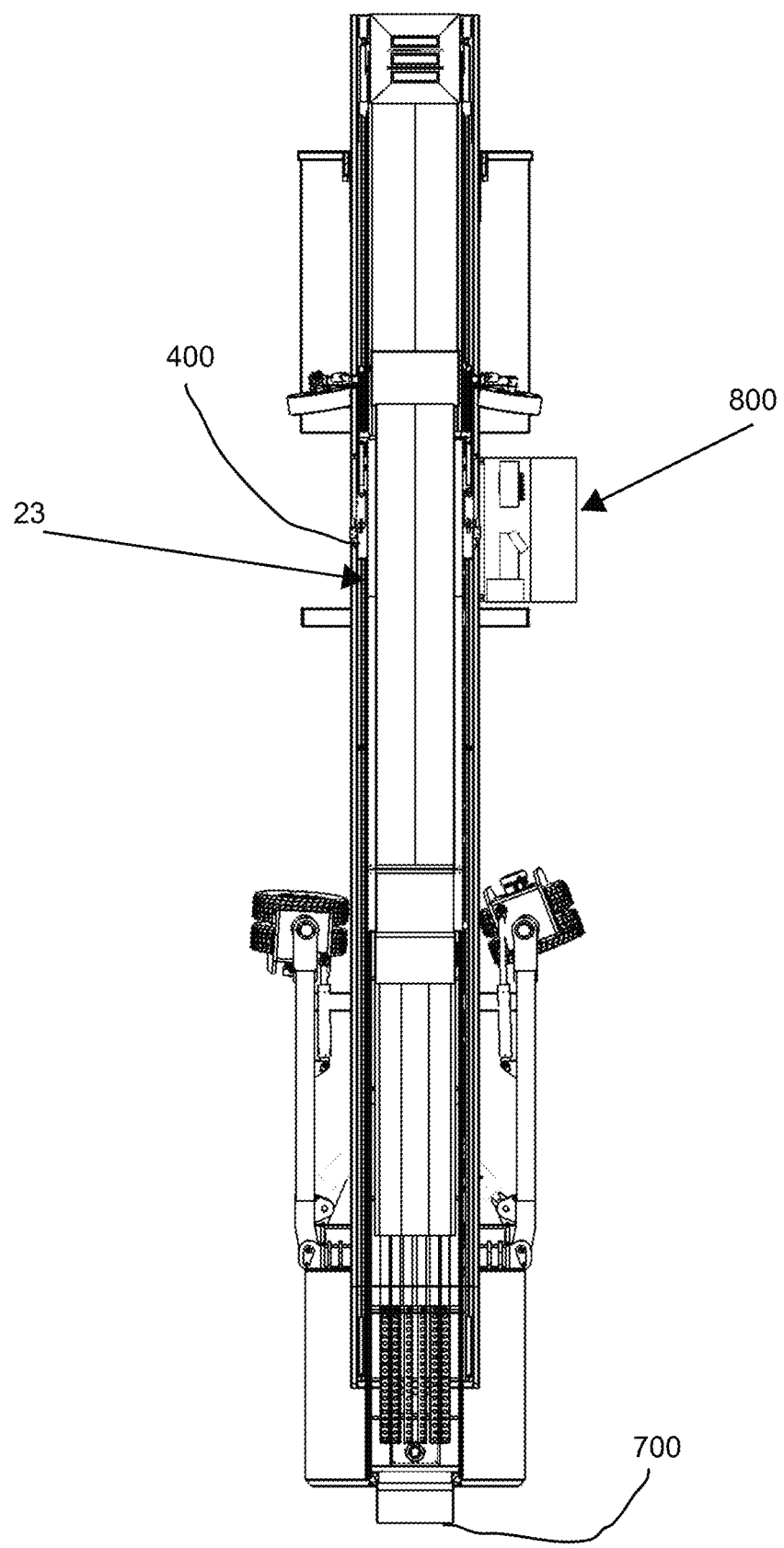
FIG. 19 illustrates an upper view of a mechanical conveyor belt system in a contracted mode.

As previously discussed with reference to FIGS. 3 and 4, the first conveyor 1 can include an array of, preferably two, small motorized rails 23 that may: (1) be operatively connected to the central engine 6 located on the mobile base 3; and (2) be configured to (i) engage the arms 400 of the second conveyor 2 to actuate and control movement of the second conveyor 2 relative to the first conveyor 1 when the second conveyor 2 is mounted on the first conveyor 1, and (ii) receive engagement wheels 1060 (described in more detail with reference to FIGS. 10A-E). With the second conveyor 2 mounted on the first conveyor 1, the second conveyor 2 can be slid, having its movement actuated by the operation of the primary control system 16, from an area where primary control system 16 is located, towards a front part of the first conveyor 1 that includes the first distal end 700. More specifically, led by the third distal end 1050, the second conveyor 2 can be slid in a forward direction 1500, as illustrated in FIG. 15, from the area including the primary control system 16, such that the third distal end 1050 can be relocated over this end portion of the transporting belt 300, and thus positioned in a transport position for the conveyor system 100.

On the other hand, the second conveyor 2 can be slid in the opposite direction to be placed into a respective operational position. Through this operation the second conveyor 2 can be positioned so that the connecting belt 1000 functions as a connection between a trailer (not shown) bearing the feedstock of interest, and the transporting belt 300 of the first conveyor 1. More specifically, when the second conveyor 2 is totally slid in a proximal manner, such that the third distal end 1050 is slid past an end of the first conveyor 1 that includes the first drum 5, and thus positioned in the operational position, the second conveyor 2 is left on a free axis and allowed to be moved in a lateral fashion.

Turning back to FIG. 10A, the second distal end 1045 is illustrated as being located spatially between the third distal end 1050 and the transition section 1040 of the second conveyor 2. The connecting belt 1000 is fitted with a rectangular shaped mechanism 24 (hereafter referred to as "receiving chute 24") that can be extended and retracted relative to the transition region 1040 (including the tires 31), as shown in FIGS. 10A, D, and E. In particular, the receiving chute 24 can be extended through a respective lateral movement in a direction of the proximal end 1030 relative to the transition region 1040, as shown in FIG. 10A. Conversely, the receiving chute 24 can be retracted through a respective (opposite) lateral movement in a direction of the second distal end 1045 relative to the transition region, as shown in FIGS. 10D and 10E. The receiving chute 24 can be extended and retracted with the operation of two metallic gear chains 25. As shown in FIG. 10C, one gear chain 25 may be provided on each side of the receiving chute 24, and operatively connected to a respective engagement wheel 1060. The extending and retracting lateral movements (relative to the transition region 1040 including the tires 31) are caused by the operation of the gear chains 25, and facilitated by the engagement wheels 1060 at the ends of the receiving chute as illustrated in FIGS. 10A, 10D, and 10E. Like the tires 31, the engagement wheels 1060 lie in contact with the surface of the ground with the second conveyor 2 in a respective operational position. The gear chains 25 may be configured to be actuated by a secondary control system 26 located in a middle part of a protective covering 22 in which the transfer region 1020 of the connecting belt 1000 is disposed. The gear chains 25 may be operatively engaged with, and obtain motive energy from, the central engine 6 located in the mobile base 3. This ability to have the gear chains 25, and thus the movement of the receiving chute 24, be powered by the central engine 6, together with the feature of being able to utilize a free axis previously mentioned, allows the second conveyor to have substantial and useful mobility.

The secondary control system 26 may be provided on a driver's side of the second conveyor 2. A close-up of the secondary control system 26 showing levers 32 that may be used to effect operation of the receiving chute 24, is provided in FIG. 10B which corresponds to detail 10B of FIG. 4.

With further reference to FIG. 10A, a receiving nozzle 27 that is shaped like a grate, may be located on top of the proximal end 1030 of the receiving chute 24 of the second conveyor 2 and be similar in size to a feedstock discharge nozzle of a trailer (not shown), from which raw material will be conveyed by the second conveyor 2 to the transporting belt 300 of the first conveyor 1. In one non-limiting example, sizes of these corresponding nozzles are of 41×40 inches. The receiving nozzle 27 may be fitted with a net 28 and small, preferably metallic, sheets 29 on each side thereof. The net 28 and the sheets 29 can function to prevent feedstock from being diverted from the connecting belt 1000 of second conveyor 2 and thus be wasted. More specifically, as the net 28 and sheets 29 extend from or are otherwise disposed over the receiving nozzle 27, these components may help maintain feedstock on the connecting belt 1000. The connecting belt 1000, which transports the feedstock to the transporting belt 300, starts running from the receiving nozzle 27.

The second conveyor 2 further includes a pair of second hydraulic jacks 30 that are perpendicular to a surface of the ground, and configured to elevate and lower the protective covering 22 and the transfer region 1020 relative to the receiving chute 24 as necessary in order to move the discharge chute 310 at the third distal end 1050. There is also a pair of tires 31 located proximal to the second distal end 1045 of the receiving chute 24 and allow lateral movements of the receiving chute 24 perpendicular to the extending (see FIG. 10A) and retracting (see FIGS. 10D and 10E) lateral movements of the receiving chute 24 enabled by the gear chains 25 and the engagement wheels 1060. All respective lateral, elevation and lowering, and cross-lateral movements of the receiving chute 24, the tires 31, and the second hydraulic jacks 30 associated with the receiving chute 24 are controlled in their totality by the secondary control system 26. More specifically, various operations of the plurality of levers 32 of the secondary control system 26 may be implemented to cause the aforementioned movements to be executed.

Figure 13:
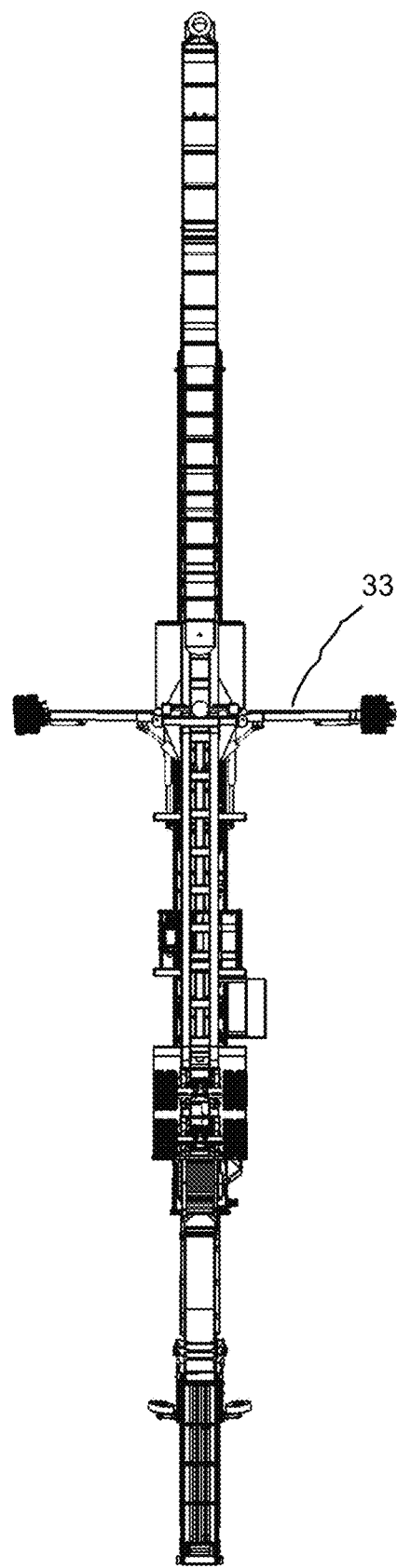
FIG. 13 illustrates a lower view of a mechanical conveyor belt system, according to the present disclosure.
Figure 14:
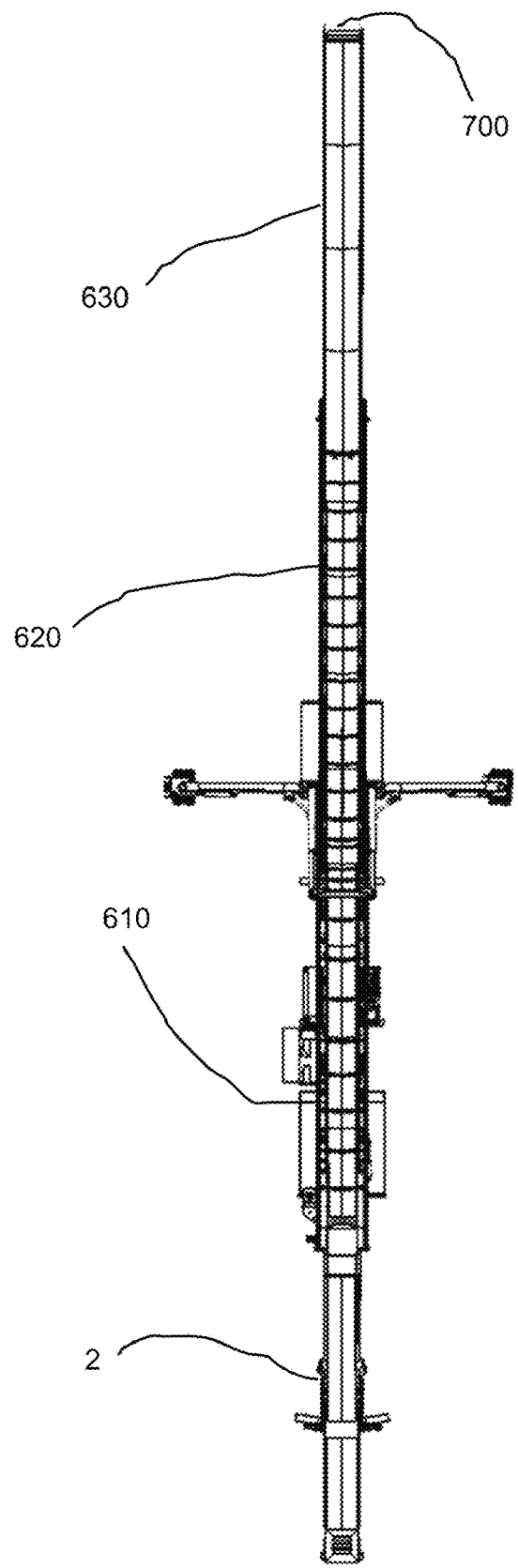
FIG. 14 illustrates an upper view of a mechanical conveyor belt system, according to the present disclosure.

Referring back to FIG. 9, the mobile base 3 may be similar in size to a conventional trailer and equipped with two wheeled stabilizers 33 located in a front part thereof. The front part of the mobile base 3 may include a kingpin 34 may be used to hook the mobile base 3 to a truck (not shown) for transport. The stabilizers 33 may be controlled from the primary control system 16, and are bent towards a rear side of the mobile base 3 in a transport position for the conveyor system 1. As illustrated in FIG. 13, for a working mode, the stabilizers 33 can be deployed in opposite directions until they reach a 90-degree angle relative to the mobile base 3. In this configuration, at least the first conveyor 1 can be moved at a working site. Stabilizer wheels 35, through the operation of third hydraulic jacks 36, enable the mobile base 3 to have a capacity to move in each of a frontward, rearward, and lateral direction. In particular, the third hydraulic jacks 36 allow for a rotation of up to 180 degrees in the stabilizer wheels 35, having the fully extended stabilizers 33 as a respective x-axis. Functioning of the conveyor system 1 is propelled in its totality by the central engine 6, which may be a hydraulic engine located at the center of the mobile base 3, and configured to provide energy to the conveyor system 1. In addition, the conveyor system 1 may include a deposit or reservoir 37 (see FIGS. 1 and 9) that stores oil for the at least the first and third hydraulic jacks 11, 36 located next to the central engine 6.

What is claimed is:

1. A mobile conveyor, comprising:
    a mobile base having a plurality of wheels and a longitudinal axis;
    a first conveyor pivotably coupled to the mobile base, the first conveyor comprising:
        a transporting belt;
        a first section including a rail;
        a second section that extends telescopically from the first section; and
        a third section that extends telescopically from the second section,
        wherein the second and third sections are configured to extend via actuation of a chain; and
    a second conveyor slidably coupled to the first conveyor, the second conveyor comprising:
        a receiving region supported by engagement wheels and configured to be positioned substantially parallel to the longitudinal axis of the mobile base when in an operational position;
        a transfer region positioned to receive granular material from the receiving region and transfer the granular material to the first conveyor;
        a connecting belt housed in the receiving region and the transfer region,
        wherein the engagement wheels are configured to engage the rail and the second conveyor is configured to transition between a transport position and an operational position by sliding along the rail.

2. The mobile conveyor of claim 1, wherein the second conveyor comprises at least two motorized wheels that, when actuated with the second conveyor in the operational position, cause the second conveyor to move in a direction crossing the longitudinal axis.

3. The mobile conveyor of claim 1, further comprising a protective structure surrounding the transporting belt and configured to extend telescopically with the first conveyor.

4. The mobile conveyor of claim 3, the protective structure comprising:
    a bottom protective portion surrounding the bottom section of the first conveyor;
    a middle protective portion surrounding the middle section of the first conveyor and sized to fit within the bottom protection portion when the first conveyor is in a retracted position;
    a top protective portion surrounding the top section of the first conveyor and sized to fit within both the middle protective portion and bottom protective portion when the first conveyor is in a retracted position.

5. The mobile conveyor of claim 1, wherein the second conveyor comprises a flexible connector positioned at a distal end of the transfer region and oriented to redirect granular material downward to the transporting belt.

6. The mobile conveyor of claim 1, wherein the first conveyor comprises a flexible nozzle positioned at a distal end of the third section and oriented to redirect granular material downward to a storage container.

7. The mobile conveyor of claim 6, wherein the first conveyor comprises a video camera mounted proximate to the flexible nozzle and oriented to capture video feed of the nozzle.

8. The mobile conveyor of claim 7, further comprising a display mounted on the mobile conveyor that displayed the video feed captured by the video camera.

9. The mobile conveyor of claim 7, wherein the first conveyor is configured to retract to a contracted mode via operation of an internal roller chain.

10. The mobile conveyor of claim 9, wherein when the first conveyor is in the contracted mode, a footprint defined by outer dimensions of the first conveyor fits within a footprint defined by outer dimensions of the mobile base.

11. The mobile conveyor of claim 1, wherein when the second conveyor is configured to be positioned in a transport position by sliding the second conveyor along the rail toward a distal end of the first conveyor.

12. The mobile conveyor of claim 11, wherein when the second conveyor is positioned in the transport position, a footprint defined by the outer dimensions of the second conveyor fits within a footprint defined by the outer dimensions of the mobile base.

13. The mobile conveyor of claim 1, further comprising two pivot arms, each pivot arm being associated with a wheel.

14. The mobile conveyor of claim 13, wherein each pivot arm is coupled to an actuator configured to transition the pivot arm between a transport position and an operational position.

15. The mobile conveyor of claim 14, wherein the pivot arms are configured to be positioned in a transport position wherein the pivot arms are oriented substantially parallel to the longitudinal axis of the mobile base.

16. The mobile conveyor of claim 14, wherein the pivot arms are configured to be positioned in an operational position wherein the pivot arms are extended substantially perpendicular to the longitudinal axis of the mobile base.

17. The mobile conveyor of claim 14, wherein the actuators coupled to the pivot arms are controlled by a single control mechanism mounted on the mobile conveyor.

18. The mobile conveyor of claim 13, wherein each wheel is mechanically coupled to an electric motor.

19. The mobile conveyor of claim 1, wherein a footprint defined by outer dimensions of the mobile conveyor, when provided in a transport position, is equal to or smaller than a footprint of a standard intermodal trailer.

20. The mobile conveyor of claim 1, wherein the mobile conveyor is configured to be towed on a roadway by a truck.

* * * * *